United States Patent
Chun et al.

(10) Patent No.: US 10,163,380 B2
(45) Date of Patent: Dec. 25, 2018

(54) IMAGE CORRECTOR, DISPLAY DEVICE INCLUDING THE SAME AND METHOD FOR DISPLAYING IMAGE USING DISPLAY DEVICE

(71) Applicant: SAMSUNG DISPLAY CO., LTD., Yongin-si, Gyeonggi-do (KR)

(72) Inventors: Byung Ki Chun, Yongin-si (KR); Jin Woo Noh, Yongin-si (KR); Jun Gyu Lee, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 162 days.

(21) Appl. No.: 15/097,149

(22) Filed: Apr. 12, 2016

(65) Prior Publication Data
US 2016/0329008 A1 Nov. 10, 2016

(30) Foreign Application Priority Data

May 6, 2015 (KR) .......................... 10-2015-0063230

(51) Int. Cl.
*G09G 5/38* (2006.01)
*H04N 5/21* (2006.01)
(Continued)

(52) U.S. Cl.
CPC ............... *G09G 3/007* (2013.01); *G09G 3/20* (2013.01); *G09G 5/38* (2013.01); *G09G 5/373* (2013.01);
(Continued)

(58) Field of Classification Search
CPC .......... G09G 3/007; G09G 3/20; G09G 5/373; G09G 5/38; G09G 2320/0257;
(Continued)

(56) References Cited

U.S. PATENT DOCUMENTS 6,791,525 B2 * 9/2004 Matsumura .......... G09G 3/3611
345/100
8,873,101 B2 10/2014 Tamura
(Continued)

FOREIGN PATENT DOCUMENTS

EP 1503360 A2 2/2005
EP 1847978 A2 * 10/2007 ............. G09G 3/007
(Continued)

OTHER PUBLICATIONS

EPO Partial Search Report dated Aug. 31, 2016, for corresponding European Patent Application No. 16168624.1 (6 pages).
(Continued)

*Primary Examiner* — Michael J Eurice
(74) *Attorney, Agent, or Firm* — Lewis Roca Rothgerber Christie LLP

(57) ABSTRACT

There is provided an image corrector including a shift determiner configured to determine a shift direction and a shift amount of an image corresponding to first image data, an area determiner configured to divide the image into a plurality of areas and, in accordance with the shift direction, to determine a first area of the plurality of areas as a reduction area and a second area of the plurality of areas as an enlargement area, and an image data generator configured to set second image data corresponding to the shift amount of the image corresponding to the first area.

20 Claims, 9 Drawing Sheets

(51) Int. Cl.
*G09G 3/00* (2006.01)
*G09G 3/20* (2006.01)
*G09G 5/373* (2006.01)

(52) U.S. Cl.
CPC ............ *G09G 2320/0257* (2013.01); *G09G 2320/041* (2013.01); *G09G 2320/046* (2013.01); *G09G 2340/0414* (2013.01); *G09G 2340/0421* (2013.01); *G09G 2340/0464* (2013.01); *H04N 5/21* (2013.01)

(58) Field of Classification Search
CPC ..... G09G 2320/0285; G09G 2320/041; G09G 2320/046; G09G 2340/0414; G09G 2340/0421; G09G 2340/045; G09G 2340/0464; G09G 2340/0471; G09G 2340/0478; G09G 2380/02; H04N 5/21
See application file for complete search history.

(56) References Cited

U.S. PATENT DOCUMENTS

| | | | | |
|---|---|---|---|---|
| 2004/0160455 A1* | 8/2004 | Weitbruch | ........... | G09G 3/2022 345/596 |
| 2005/0018046 A1* | 1/2005 | Tsuzuki | ................ | G09G 3/007 348/173 |
| 2006/0022968 A1* | 2/2006 | Kondo | ................ | G09G 3/3208 345/211 |
| 2007/0024608 A1* | 2/2007 | Sakuragi | ................ | G09G 3/007 345/204 |
| 2008/0174518 A1* | 7/2008 | Sakuragi | ................. | G09G 3/22 345/10 |
| 2008/0316318 A1* | 12/2008 | Hoffman | .............. | H04N 5/7416 348/177 |
| 2009/0058873 A1* | 3/2009 | Brown | ................... | G06T 5/009 345/589 |
| 2009/0109247 A1* | 4/2009 | Kimura | ............... | G09G 3/3666 345/690 |
| 2009/0122207 A1* | 5/2009 | Inoue | .................. | G09G 3/2025 348/739 |
| 2010/0117975 A1* | 5/2010 | Cho | ...................... | G06F 1/1626 345/173 |
| 2011/0261002 A1* | 10/2011 | Verthein | ................. | G06F 1/181 345/174 |
| 2012/0140248 A1* | 6/2012 | Tamura | .............. | G03G 15/0115 358/1.2 |
| 2012/0236040 A1* | 9/2012 | Eom | ...................... | G09G 3/007 345/681 |
| 2013/0215041 A1* | 8/2013 | Kim | ...................... | G06F 3/0487 345/173 |
| 2014/0300557 A1 | 10/2014 | Cho et al. | | |
| 2015/0054814 A1* | 2/2015 | Takeda | ................. | G09G 3/3208 345/212 |
| 2015/0138041 A1* | 5/2015 | Hirakata | ............... | G06F 3/1446 345/1.3 |
| 2015/0221248 A1* | 8/2015 | Kim | ...................... | G09G 3/2044 345/204 |
| 2015/0371613 A1* | 12/2015 | Patel | ....................... | G06F 21/10 345/549 |
| 2016/0111034 A1* | 4/2016 | Lee | ........................... | G09G 3/20 345/213 |
| 2016/0170273 A1* | 6/2016 | Lee | ................... | G02F 1/134309 349/43 |
| 2016/0179269 A1* | 6/2016 | Chun | .................... | G06F 3/0412 345/173 |
| 2016/0320916 A1 | 11/2016 | Chun et al. | | |
| 2016/0321974 A1* | 11/2016 | Chun | ..................... | G09G 3/007 |
| 2016/0343354 A1* | 11/2016 | Noh | .......................... | G09G 3/20 |
| 2017/0115821 A1* | 4/2017 | Chun | .................... | G06F 3/0418 |

FOREIGN PATENT DOCUMENTS

| | | |
|---|---|---|
| EP | 2500896 A1 | 9/2012 |
| JP | 2012-121165 A | 6/2012 |
| KR | 10-2004-0026059 A | 3/2004 |
| KR | 10-0551052 B1 | 2/2006 |
| KR | 10-2007-0048852 A | 5/2007 |
| KR | 10-2014-0120470 A | 10/2014 |
| KR | 10-2016-0129983 | 11/2016 |
| KR | 10-2016-0130027 | 11/2016 |

OTHER PUBLICATIONS

EPO Partial Search Report dated Sep. 23, 2016 for European Patent Application No. 16170870.6 (8 pages), corresponding to U.S. Appl. No. 15/011,776.

U.S. Office Action dated Dec. 20, 2016, issued in cross-reference U.S. Appl. No. 15/011,776 (24 pages).

EPO Office Action dated Jun. 28, 2018, for corresponding European Patent Application No. 16168624.1 (4 pages).

\* cited by examiner

| FI | [(SDx)SQx , (SDy)SQy] |
|---|---|
| 10 | [(−)1 , 0] |
| 20 | [(−)1 , (+)1] |
| 30 | [ 0 , (+)1] |
| 40 | [(+)1 , (+)1] |
| 50 | [(+)1 , 0 ] |
| ⋮ | ⋮ |

LUT

IMAGE CORRECTOR, DISPLAY DEVICE INCLUDING THE SAME AND METHOD FOR DISPLAYING IMAGE USING DISPLAY DEVICE

CROSS-REFERENCE TO RELATED APPLICATION

This application claims priority to, and the benefit of, Korean Patent Application No. 10-2015-0063230, filed on May 6, 2015, in the Korean Intellectual Property Office, the entire content of which is incorporated herein by reference in its entirety.

BACKGROUND

1. Field

Aspects of embodiments of the present invention relate to an image corrector, a display device including the same, and a method for displaying an image using a display device.

2. Description of the Related Art

In recent years, various types of display devices, such as organic light emitting display devices, liquid crystal display devices, plasma display devices, and the like, have been widely used. Because the display devices may continuously output a certain image or a certain letter for an extended period of time, the display devices may experience performance deterioration due to certain pixels corresponding to the certain image or letter being subject to heat deterioration.

To overcome this limitation, an image corresponding to the certain image or letter may be moved on the display panel at a set cycle, or pixel shifting may be used. When the image is moved at a set cycle and is displayed, same data may be prevented from being output for a long time from a certain pixel, and therefore, heat deterioration of the certain pixel may be reduced or avoided.

Moving the image and displaying it uses a method for generating new image data by storing image data before moving and after moving the image. To generate new image data, image data before the shifting and image data after the shifting must be separately stored in a memory.

Also, because new image data is generated by combining the image data before the move with the image data after the move, a problem arises in which after image occurrence is not fundamentally resolved.

SUMMARY

Aspects of embodiments of the present invention are directed to an image corrector, a display device having the same, and an image display method using the display device to reconfigure image data without additional memory, thereby reducing or minimizing thermal deterioration of certain pixels, and thereby providing pixel shifting technology capable of effectively reducing or preventing after image effect.

According to some embodiments of the present invention, there is provided an image corrector including: a shift determiner configured to determine a shift direction and a shift amount of an image corresponding to first image data; an area determiner configured to divide the image into a plurality of areas and, in accordance with the shift direction, to determine a first area of the plurality of areas as a reduction area and a second area of the plurality of areas as an enlargement area; and an image data generator configured to set second image data corresponding to the shift amount of the image corresponding to the first area.

In an embodiment, the image corrector further includes a frame data counter configured to receive frame data including a plurality of image data and to calculate input number of the frame data.

In an embodiment, the shift determiner is further configured to determine a look-up table corresponding to the input number and to determine the shift direction and the shift amount using a value in the look-up table.

In an embodiment, the shift determiner is further configured to: an x-axis shift direction and an x-axis shift amount of the image; and a y-axis shift direction and a y-axis shift amount of the image.

In an embodiment, the shift determiner is configured to determine the x-axis shift amount such that the image shifts along an x-axis by an amount that is less than a size of an image displayed in one pixel.

In an embodiment, the shift determiner is configured to determine the y-axis shift amount such that the image shifts along a y-axis by an amount that is less than a size of an image displayed in one pixel.

In an embodiment, the shift determiner is configured to determine the y-axis shift direction and the y-axis shift amount after determining the x-axis shift direction and the x-axis shift amount.

In an embodiment, the shift determiner is configured to determine the x-axis shift direction and the x-axis shift amount after determining the y-axis shift direction and the y-axis shift amount.

In an embodiment, the area determiner is configured to set a third area between the first area and the second area, and the third area of the image is shifted in a direction towards a location of the reduction area in the enlargement area.

In an embodiment, the image data generator is further configured to combine a portion of image data for displaying a third area and image data for displaying the first area to generate enlarged image data, the third area being between the first area and the second area.

In an embodiment, the image data generator is further configured to set enlarged image data corresponding to the shift amount to image data to be input into the second area.

In an embodiment, the image data generator is further configured to generate enlarged image data using a portion of image data for displaying the second area.

In an embodiment, the image is shifted from the enlargement area to the reduction area.

In an embodiment, a size of the image is maintained to be the same as that of the image prior to the shift and that of the image after the shift.

According to some embodiments of the present invention, there is provided a display device including: a display panel including a plurality of pixels; and an image corrector configured to generate image data, wherein the image corrector includes: a shift determiner configured to determine a shift direction and a shift amount of an image; an area determiner configured to divide the image into a plurality of areas, to determine a first area of the plurality of areas as a reduction area in accordance with the shift direction, and to determine a second area as an enlargement area; and an image data generator configured to set image data, which is reduced to correspond to the shift amount, to image data for displaying the first area.

In an embodiment, the image corrector further includes a frame data counter configured to receive frame data including a plurality of image data and to calculate an input number of the frame data, the shift determiner is further configured to determine a look-up table corresponding to the input number, and to use values contained in the look-up table to determine the shift direction and the shift amount.

In an embodiment, the shift determiner is further configured to determine the shift amount such that the image is shifted by an amount that is less than a size of an image displayed in one pixel.

In an embodiment, the image is shifted toward a location of the reduction area in the enlargement area, and wherein a size of the image prior to the shift is the same as a size of the image after the shift.

In an embodiment, the image data generator is further configured to combine a portion of image data for displaying a third area between the first area and the second area and image data for displaying the first area to generate reduced image data.

According to some embodiments of the present invention, there is provided a method for displaying images by a display device including a display panel including a plurality of pixels and an image corrector generating image data, the method including: receiving frame data including a plurality of image data, by the image corrector; calculating an input number of the frame data; determining a look-up table corresponding to a result of the calculation, by the image corrector; determining a shift direction and a shift amount of an image using a value in a look-up table, by the image corrector; dividing the image into a plurality of areas; determining a first area as a reduced area of the plurality of areas, and a second area as an enlarged area, depending on the shift direction; and setting reduced image data corresponding to the shift amount to image data for displaying the first area.

According to embodiments of the present invention, by reconfiguring image data without separate memory, deterioration of certain pixels may be reduced or minimized, and after image may be avoided more effectively.

BRIEF DESCRIPTION OF THE DRAWINGS

Example embodiments will now be described more fully hereinafter with reference to the accompanying drawings; however, embodiments of the present invention may be embodied in different forms and should not be construed as limited to the embodiments set forth herein. Rather, these embodiments are provided so that this disclosure will be thorough and complete, and will fully convey the scope of the example embodiments to those skilled in the art.

In the drawings, dimensions may be exaggerated for clarity of illustration. Like reference numerals refer to like elements throughout.

DETAILED DESCRIPTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like numbers refer to like elements throughout.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
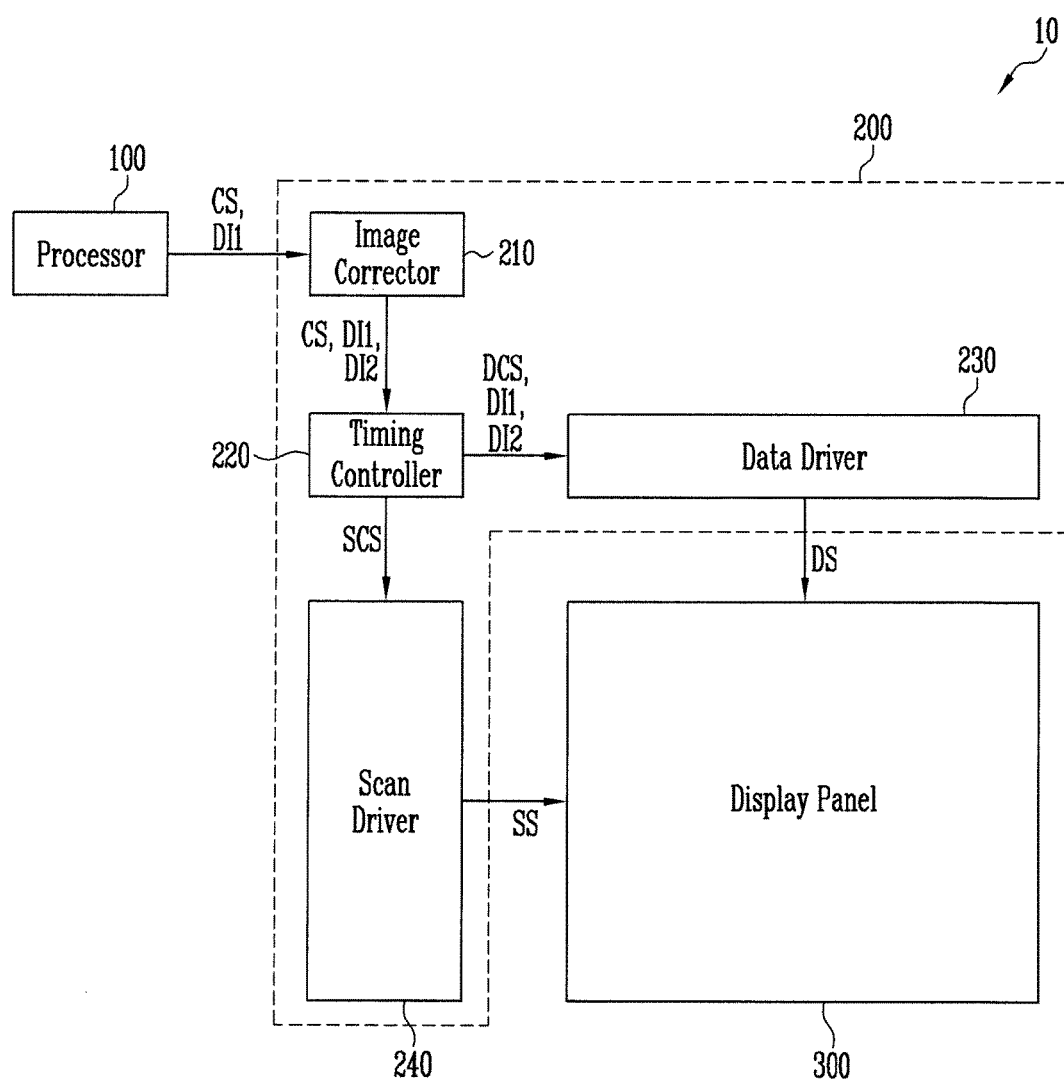
FIG. 1 is a schematic block diagram of a display device according to an embodiment of the present invention.

FIG. 1 is a schematic block diagram of a display device according to an embodiment of the present invention.

Referring to FIG. 1, a display device 10 according to an embodiment may include a processor 100, a display driver 200, and a display panel 300.

The processor 100 may supply a first image data DI1 and a control signal CS to the display driver 200. For example, an embodiment of the processor 100 may be implemented with an integrated circuit, an application processor, a mobile application processor, or a processor capable of controlling operation of the display driver 200. For example, a control signal may include a vertical synchronization signal, a horizontal synchronization signal, a data enable signal, a clock signal and the like.

The display driver 200 may include an image corrector 210, a timing controller 220, a scan driver 240 and a data driver 230.

The image corrector 210 may generate a first image data DI1, which is supplied from the processor 100, and a second image data DI2 by using a control signal CS. Also, the image corrector 210 may transmit the first image data DI1, the second image data DI2, and the control signal CS to the timing controller 220. The second image data DI2 may refer to the first image data DI1 that is moved using pixel shifting.

In accordance with another embodiment, the image corrector 210 may supply the first image data DI1, the second image data DI2, and the control signal CS to the data driver 230.

In accordance with an embodiment, the image corrector 210 may be separated from the display driver 200. In accordance with another embodiment, the image corrector 210 may be integrated into the timing controller 220.

The timing controller 220 may convert the first image data DI1 into the second image data DI2. The timing controller 220 may receive the first image data DI1, the second image data DI2, and the control signal CS from the image corrector 210.

The timing controller 220 may generate a timing control signal for controlling the scan driver 240 and the data driver 230 based on the control signal CS. For example, the timing control signal may include a scan timing control signal SCS for controlling the scan driver 240, and a data timing control signal DCS for controlling the data driver 230. The timing controller 220 may supply the scan timing control signal SCS to the scan driver 240, and may supply the data timing control signal DCS to the data driver 230.

The timing controller 220 may supply the first image data DI1 to the data driver 230 during a first period to display a first image, and may supply the second image data DI2 to the data driver 230 during a second period to display a second image.

The data driver 230 may receive the data timing control signal DCS and the first and second image data DI1 and DI2 from the timing controller 220, and may generate a data signal DS. The data driver 230 may supply the generated data signal DS to data lines. The data driver 230 may be electrically coupled to the data lines located at the display panel 300 through separate components. In accordance with another embodiment, the data driver 230 may be directly mounted on the display panel 300.

For example, when the timing controller 220 or the image corrector 210 supplies the first image data DI1, the data driver 230 may supply the data signal DS corresponding to the first image data DI1, thereby displaying the first image. Also, when the timing controller 220 or the image corrector 210 supplies the second image data DI2, the data driver 230 may supply the data signal DS corresponding to the second image data DI2, thereby displaying the second image.

The scan driver 240 may supply scan signals SS to scan lines in response to the scan timing control signal SCS. The scan driver 240 may be electrically coupled to the scan lines positioned in the display panel 300. In accordance with another embodiment, the scan driver 240 may be directly mounted on the display panel 300. The data driver 230 and the scan driver 240 may be separate.

When the scan signal SS is supplied, pixels of the display panel 300, which receive the data signal DS through the data lines, may emit light of a brightness corresponding to the data signal DS. The display panel 300 may include pixels displaying preset image.

For example, the display panel 300 may be an organic light emitting display panel, a liquid crystal display panel, a plasma display panel, etc., although the display panel 300 is not limited thereto.

Figure 2:
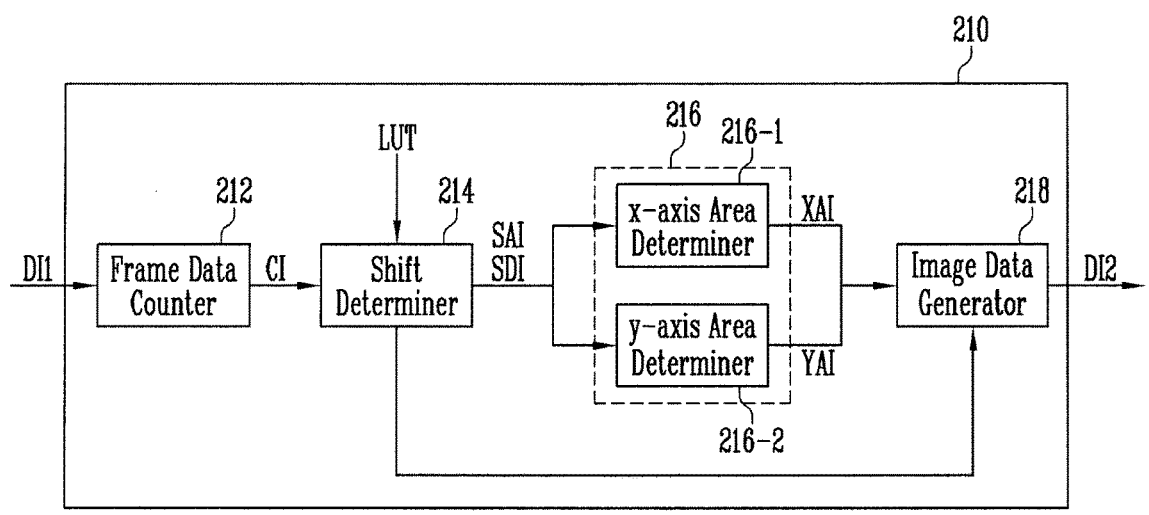
FIG. 2 is a schematic block diagram of an image corrector according to an embodiment of the present invention.

FIG. 2 is a schematic block diagram of an image corrector according to an embodiment of the present invention.

Referring to FIG. 2, the image corrector 210 may include a frame data counter 212, a shift determiner 214, an area determiner 216, and an image data generator 218.

The frame data counter 212 may calculate frame information CI. The frame data counter 212 may use the control signal CS (e.g., a vertical synchronization signal), which is supplied from the processor 100, to calculate to which frame the first image data DI1, which is concurrently supplied to the frame data counter 212, belongs. The frame data counter 212 may supply the frame information CI to the shift determiner 214.

The shift determiner 214 may determine a shift direction and a shift amount of the image. In further detail, the shift determiner 214 may determine an x-axis shift direction, a y-axis shift direction, an x-axis shift amount, and a y-axis shift amount. The shift determiner 214 may generate shift direction information SDI, which includes information regarding a shift direction of the determined image, and may generate shift amount information SAI, which includes information regarding a shift amount of the determined image.

For example, the shift determiner 214 may refer to the frame information CI transferred from the frame data counter 212, may determine the x-axis shift direction, the y-axis shift direction, the x-axis shift amount, and the Y-axis shift amount corresponding to the frame information CI, and may generate the shift direction information SDI and the shift amount information SAI.

The shift determiner 214 may use a look-up table LUT. In accordance with an embodiment, the shift determiner 214 may generate a look-up table including information regarding shift direction and shift amount of image, and may determine the shift direction and the shift amount of the image using the generated look-up table. In accordance with another embodiment, the shift determiner 214 may determine the shift direction and the shift amount of the image using the look-up table, which is transferred from an external device, or which is already stored. The look-up table will be described in more detail with reference to FIGS. 12 and 13.

The area determiner 216 may include an x-axis area determiner 216-1 and a y-axis area determiner 216-2. The x-axis area determiner 216-1 may determine an x-axis area using the shift direction information SDI and the shift amount information SAI, and may generate x-axis area information XAI with respect to the determined x-axis area. The x-axis area may include an x-axis reduced area, an x-axis enlarged area, and/or an x-axis shift area.

The y-axis area determiner 216-2 may determine shift direction information SDI and shift amount information SAI to determine y-axis area, and may generate y-axis area information YAI with respect to the determined y-axis area. The y-axis area may include a y-axis reduced area, a y-axis enlarged area, and a y-axis shift area.

The image data generator 218 may generate second image data DI2 to be provided to each area using the x-axis area information XAI and the y-axis area information YAI.

Figure 3:
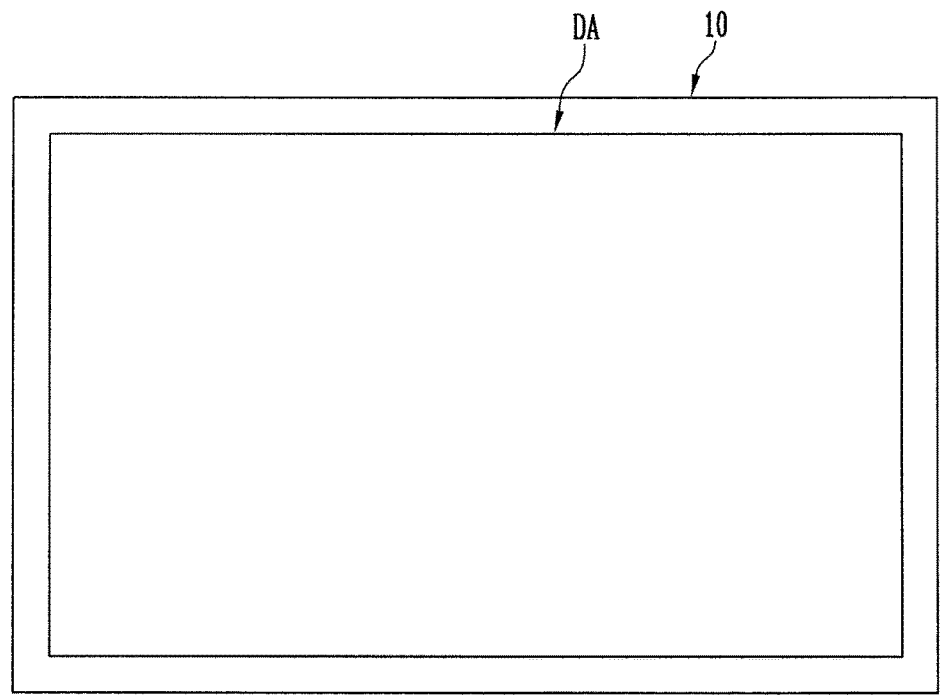
FIG. 3 is a conceptual diagram of an image display area according to an embodiment of the present invention.

FIG. 3 is a conceptual diagram of an image display area according to an embodiment of the present invention.

Referring to FIG. 3, a display device 10 according to an embodiment may include an image display area DA capable of displaying images. The display device 10 may be a device for providing preset images to users, and for displaying images on the image display area DA. Users of the display device 10 may see images displayed on the display area DA.

For example, the display device 10 may be implemented with a mobile phone, a smart phone, a personal digital assistant (PDA), an enterprise digital assistant (EDA), a digital still camera, a digital video camera, a portable multimedia player (PMP), a personal navigation device, a portable navigation device (PND), a mobile internet device (MID), a wearable computer, an organic light emitting display device, a liquid crystal display device, a plasma display device, a quantum dot display device, and the like.

Figure 4A:
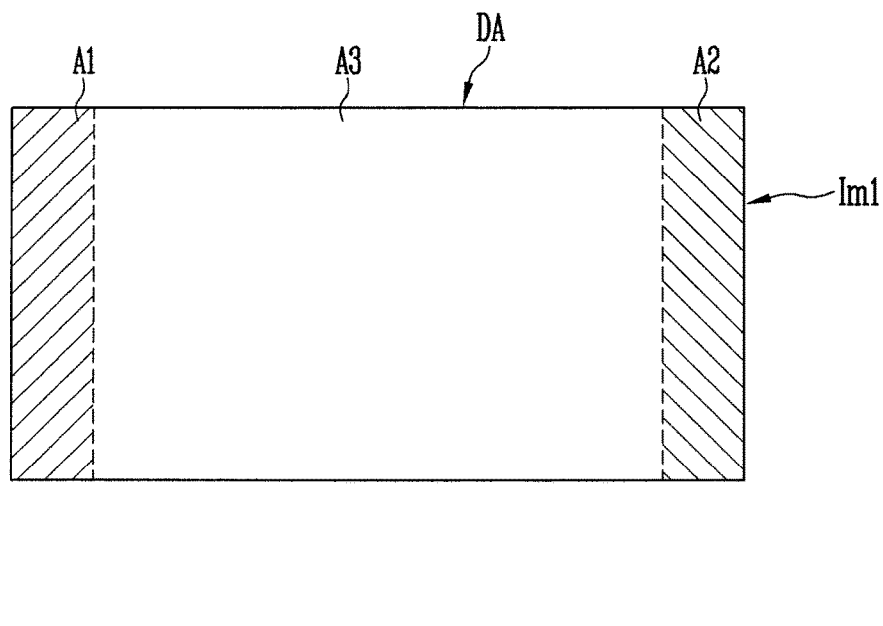
FIGS. 4A and 4B are conceptual diagrams for illustrating a method for displaying an image according to an embodiment of the present invention.
Figure 4B:
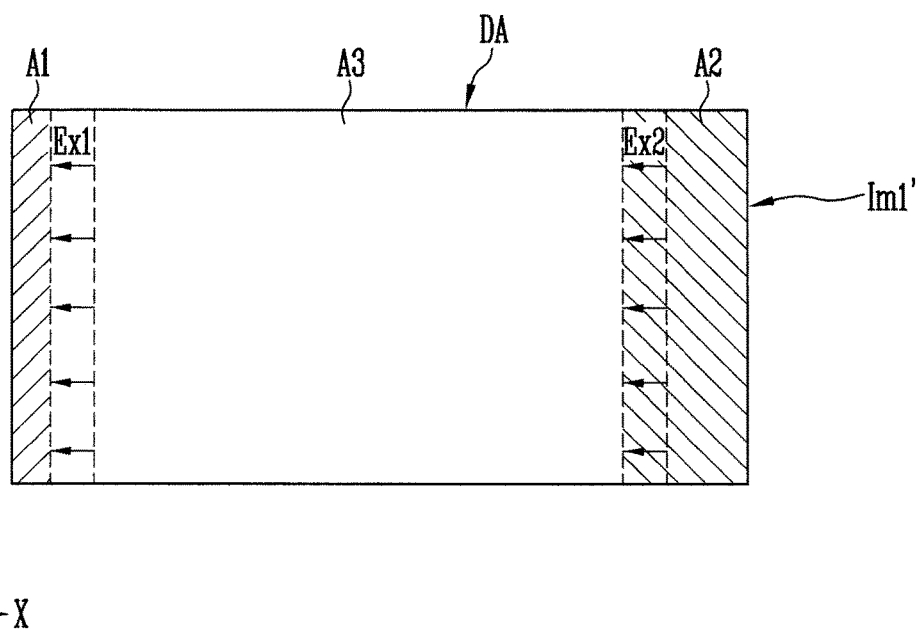

FIGS. 4A and 4B are conceptual diagrams for illustrating a method for displaying an image according to an embodiment of the present invention.

Referring to FIG. 4A, the display device may display an image Im1 on the image display area DA during an n-th period (where n is a natural number). A size of the image Im1 may be set smaller than the image display area DA. The image Im1 may include a plurality of areas. For example, the image Im1 may include a first area A1, a second area A2, and a third area A3. The third area A3 may be between the first area A1 and the second area A2. The first area A1 may be on the left side of the third area A3, and the second area A2 may be on the right side of the third area A3.

In a method of displaying an image of the display device in accordance with an embodiment, the image Im1 may be shifted and displayed, and certain areas included in the image Im1 may be reduced or enlarged. For example, the image Im1 may be displayed on a certain position of the image display area DA during an n-th period, and the image Im1 may be displayed as an image Im1' at a different position, as shifted in a certain direction (e.g., the x-axis direction) during an (n+m)-th period (where m is a natural number). That is, the image Im1 may be shifted in a negative x-axis direction (e.g., left), or in a positive x-axis direction (e.g., right) for a certain distance.

Referring to FIG. 4B, the display device 10 may display an image Im1' on a display area DA during an (n+m)-th period. For example, the display device 10 may display the image Im1' on the image display area DA in accordance with the second image data.

The image corrector 210 may set the first area A1 to the x-axis reduced area, and may set the second area A2 to the x-axis enlarged area. The image Im1' may be the image Im1 that is shifted by pixel shift operation, and displayed.

The first area A1 of the image Im1 may be reduced by as little as a first extension Ex1 due to image shifting, and the second area A2 of the image Im1 may be enlarged by as much as a second extension Ex2. For example, the first area A1 and the second area A2 of the image Im1 may maintain a certain area during an n-th period, as shown in FIG. 4a, while the first area A1 of the image Im1' may be reduced by the first extension Ex1 during the (n+m)-th period, and the second area A2 may be enlarged by the second extension Ex2 during the (n+m)-th period. Further, the second area A2 may be enlarged by as much as the first area A1 is reduced. That is, the first extension Ex1 may be the same as the second extension Ex2.

The display device 10 may shift the image Im1' with its entire size maintained. In other words, the size of the image Im1' displayed after being shifted, in accordance with an embodiment, may be maintained the same as the size of the image Im1 before being shifted.

The image Im1 may shift along a direction in which the first area A1 is reduced.

The image corrector 210 may set the third area to the x-axis shift area. Accordingly, the third area A3, which is positioned between the first area A1 and the second area A2, may shift along the direction in which the first area A1 is reduced, and may maintain its size, without being reduced or enlarged.

In FIGS. 4A and 4B, the area positioned on the left side of the images Im1 and Im1' may be referred to as the first area A1, and the area positioned on the right side of the images Im1 and Im1' may be referred to as the second area A2. However, the first area A1 may be the second area A2, and vice versa. For example, the area positioned on the right sides of the images Im1 and Im1' may be set to the first area A1, and the area positioned on the left sides of the images Im1 and Im1' may be set to the second area A2.

By shifting the image Im1, after image may be prevented or substantially prevented from occurring, and at the same time, reduction and enlargement of inner areas A1 and A2 of the image Im1 may be performed. As a result, the afterimage phenomenon may be more effectively avoided.

Figure 5:
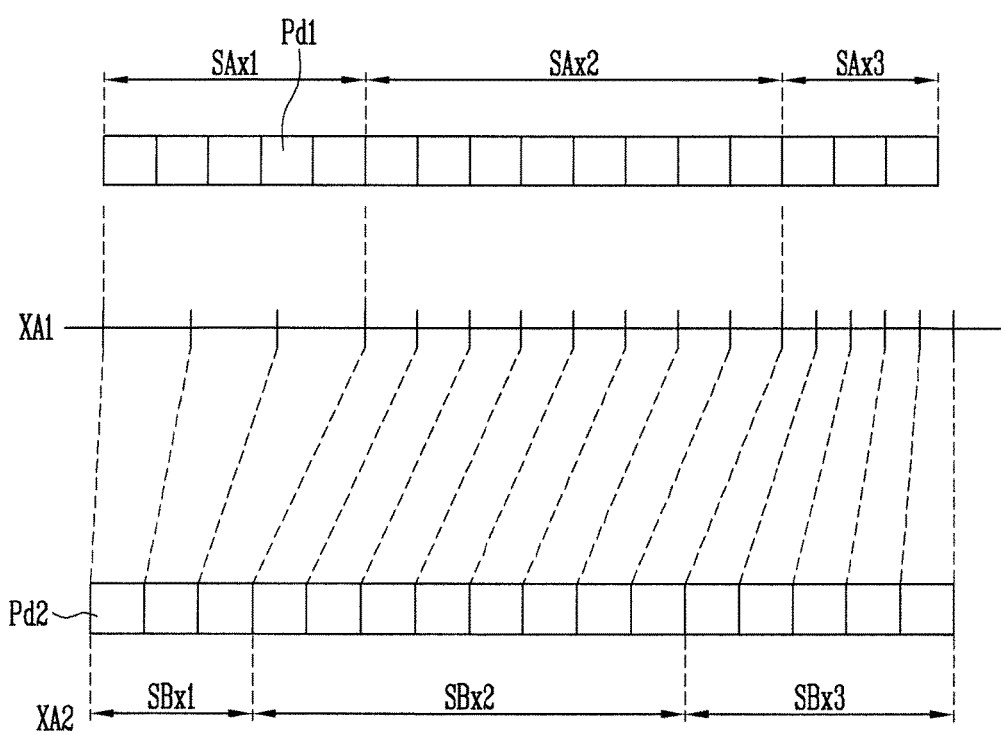
FIG. 5 is a conceptual diagram for illustrating a method for generating image data in an x-axis direction of an image corrector according to an embodiment of the present invention.

FIG. 5 is a conceptual diagram for illustrating a method for generating image data in an x-axis direction of an image corrector according to an embodiment of the present invention.

In FIG. 5, for convenience of illustration, x-axis image data is shown to be input in one row of pixels among pixels arranged in lattice form, and image data Pd1 or Pd2 refers to data for displaying images to pixels. Also, it is assumed that the first image data DI1 includes the image data Pd1, and that the second image data DI2 includes the image data Pd2.

The x-axis area determiner 216-1 may divide the image into sub-areas SAx1, SAx2, and SAx3 along the x-axis direction. The x-axis area XA1 prior to shifting may include sub-areas SAx1, SAx2, and SAx3. Also, the x-axis area XA2 after the shifting may include sub areas SBx1, SBx2, and SBx3.

For example, the x-axis area determiner 216-1 may determine the image displayed at the first to fifth pixels from the left side to correspond to the first area SAx1 before shifting, may determine the image displayed on the first to third pixels from the right side to be the second area SAx3, and may determine the third area SAx2 (prior to shifting) as corresponding to the pixels positioned between the first area SAx1 and the second area SAx3.

The image data generator 218 may generate the image data Pd2 such that the image data Pd1 for displaying the sub areas SAx1, SAx2, and SAx3 can be used to display the sub areas SBx1, SBx2, and SBx3. That is, the image data generator 218 may convert the image data Pd1 for displaying the first area SAx1 prior to the shift into the image data Pd2 for displaying the first area SBx1 after the shift. Also, the image data generator 218 may convert the image data Pd1 for displaying the second area SAx3 prior to the shift into the image data Pd2 for displaying the second area SBx3 after the shift. Also, the image data generator 218 may convert the image data Pd1 for displaying the third area SAx2 prior to shifting into the image data Pd2 for displaying the third area SBx2 after the shifting.

Figure 6:
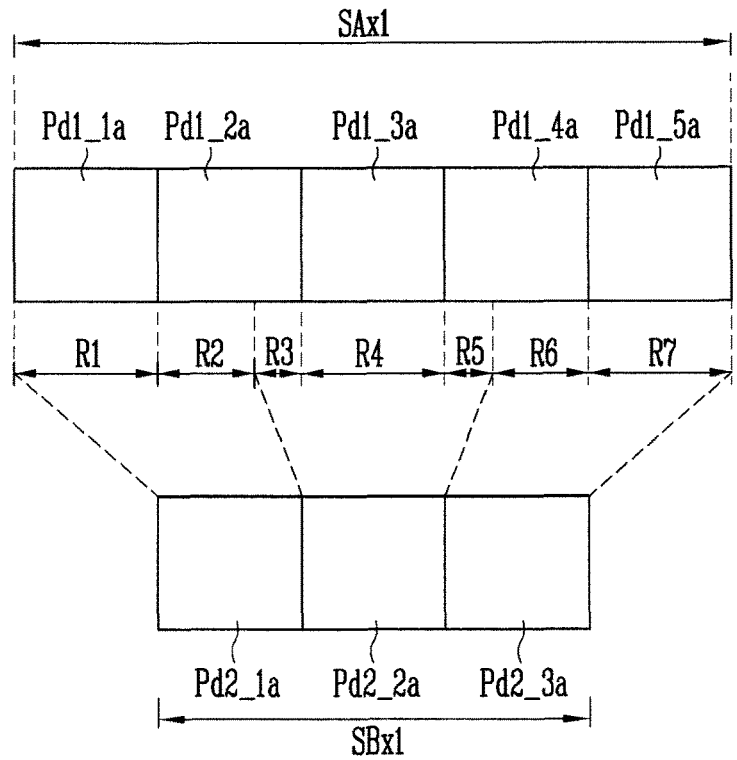
FIG. 6 is a conceptual diagram for illustrating a reduced area shown in FIG. 5.

FIG. 6 is a conceptual diagram for illustrating a reduced area shown in FIG. 5.

Referring to FIGS. 5 and 6, the x-axis area determiner 216-1 may determine the first area SBx1 after shifting, which is reduced from the first area SAx1 prior to shifting, using the shift direction information SDI and the shift amount information SAI generated by the shift determiner 214. For example, when the shift direction information SDI is set to the negative x-axis direction, and when the shift amount information SAI is set to n pixel shifting (where n is a positive number), the x-axis area determiner 216-1 may set the first area SBx1 after the shift, which is reduced by n pixel shifting in the negative x-axis direction from the first area SAx1 prior to the shift.

Thereafter, to reduce the image, the image data generator 218 may convert the image displayed on p pixels (where p is a positive number) of the first area SAx1 prior to the shift (e.g., five pixels in FIG. 5) into the image displayed on q pixels (where q is a positive number less than p) of the first area SBx1 after the shift (e.g., three pixels in FIG. 5). That is, the image data generator 218 may convert the image data to be supplied to p pixels into the image data to be supplied to q pixels. Because the image being displayed on p pixels is shifted to be displayed on q pixels, the image displayed in the first area SBx1 after the shift may be displayed on a reduced scale of a "k ratio" when compared to the image displayed in the first area SAx1 before the shift (where k=q/p).

Referring to FIG. 6, the image data generator 218 may recombine the image data Pd1_1a, Pd1_2a, Pd1_3a, Pd1_4a, and Pd1_5a, which displays the first area SAx1 prior to the shift, and may convert the image data into the image data Pd2_1a, Pd2_2a, and Pd2_3a for displaying the first area SBx1 after the shift.

For convenience of illustration, it is assumed that there is a first area SAx1 prior to the shift, which includes five pixels and image data Pd1_1a, Pd1_2a, Pd1_3a, Pd1_4a, and Pd1_5a to be input into the five pixels, and it is assumed that the five pixels are sequentially arranged in the first area SAx1 prior to the shift. It is also assumed that the first area SBx1 after the shift includes three pixels, and that the three pixels are sequentially arranged.

The image data generator 218 may generate image data Pd2_1a, Pd2_2a, and Pd2_3a to be input into the three pixels using the image data Pd1_1a, Pd1_2a, Pd1_3a, Pd1_4a, and Pd1_5a to be input into the five pixels. For example, the image data generator 218 may generate the image data Pd2_1a by using the image data Pd1_1a displayed in an area R1 and by using the image data Pd1_2a displayed in an area R2. Also, the image data generator 218 may generate the image data Pd2_2a by using the image data Pd1_2a displayed in an area R3, the image data Pd1_3a displayed in an area R4, and the image data Pd1_4a displayed in an area R5 (where a size of the area R2=a size of the area R3+a size of the area R5). Also, the image data generator 218 may generate the image data Pd2_3a by using the image data Pd1_4a displayed in an area R6 and by using the image data Pd1_5a displayed in an area R7 (where the size of the area R2=a size of the area R6).

The display device may display the image in the first area SBx1 after the shift, which is reduced from the image displayed in the first area SAx1 prior to the shift, by using the image data Pd2_1a, Pd2_2a, and Pd2_3a generated by the image data generator 218. The image displayed in the first area SAx1 prior to the shift may be displayed in the first area SBx1 after the shift on a reduced scale of 3/5.

Accordingly, the image displayed on the pixel positioned first from the left side in the first area SBx1 after the shift may be reduced from the corresponding image prior to the shift, and may be shifted by as much as the area R2 in the negative x-axis direction.

Also, the image displayed in the pixel positioned second from the left side in the first area SBx1 after the shift may be reduced from the image prior to the shift, and may be shifted by as much as the area R2 in the negative x-axis direction, and the image displayed in the pixel positioned third from the left side in the first area SBx1 after the shift may be reduced from the image prior to the shift, and may be shifted by as much as the area R2 in the negative x-axis direction.

Figure 7:
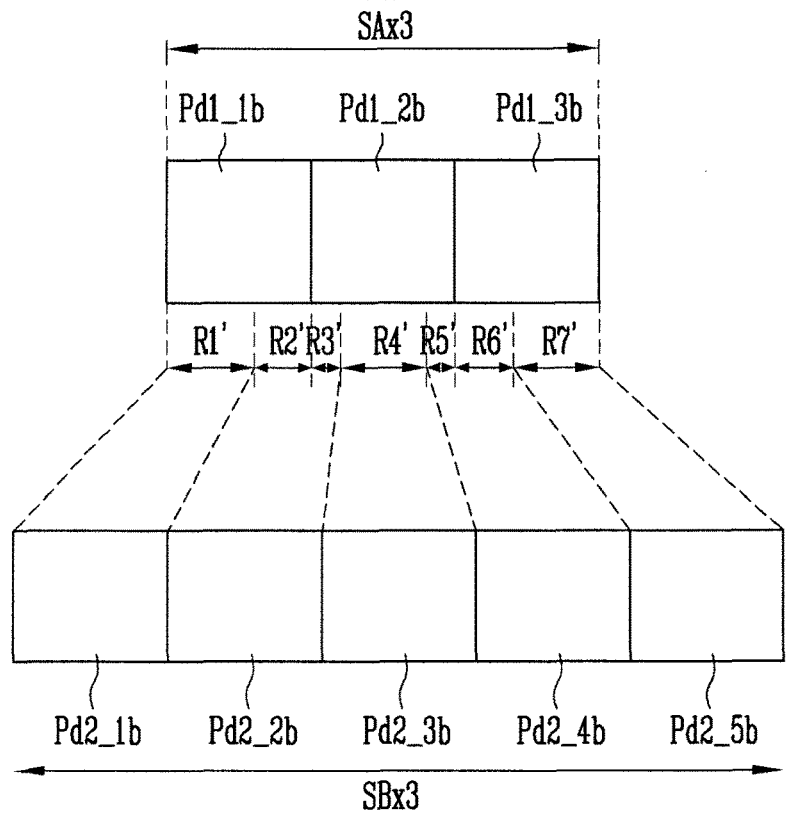
FIG. 7 is a conceptual diagram for illustrating an expanded area shown in FIG. 5.

FIG. 7 is a conceptual diagram for illustrating an expanded area shown in FIG. 5.

Referring to FIGS. 5 and 7, the x-axis area determiner 216-1 may determine the second area SBx3 after the shift, which is enlarged from the second area SAx3 prior to the shift, by using the shift direction information SDI and the shift amount information SAI generated by the shift determiner 214.

When the shift direction information SDI is set to the negative x-axis shift direction, and when the shift amount information SAI is set to n pixel shifting (where n is a positive number), the x-axis area determiner 216-1 may set the second area SBx3 after the shift, which is enlarged by as much as n pixel shifting in the negative x-axis shift direction when compared to the second area SAx3 prior to the shift.

To enlarge the image, the image data generator 218 may convert the image displayed in j pixels (where j is a positive number, e.g., j=3 in FIGS. 5 and 7) of the second area SAx3 prior to the shift, into the image displayed in i pixels (where i is a positive number greater than j, e.g., i=5 in FIGS. 5 and 7) of the second area SBx3 after shifting. The image data generator 218 may convert the image data to be supplied to the j pixels into the image data to be supplied to the i pixels.

Because the image displayed in the j pixels is displayed in the i pixels, the image displayed in the second area SBx3 after the shift may be displayed as being further enlarged, as compared to the image displayed in the second area SAx3 prior to the shift, by an enlarged scale of k' (where k'=i/j).

Referring to FIG. 7, the image data generator 218 may recombine the image data Pd1_1b, Pd1_2b, and Pd1_3b displaying the second area SAx3 prior to the shift, and may convert the image data into the image data Pd2_1b, Pd2_2b, Pd2_3b, Pd2_4b, and Pd2_5b displaying the second area SBx3 after the shift.

For convenience of illustration, it is assumed that there is a second area SAx3 prior to the shift, which includes three pixels and image data Pd1_1b, Pd1_2b, and Pd1_3b to be input into the three pixels, and that the three pixels are sequentially arranged in the second area SAx3 prior to the shift. It is also assumed that the second area SBx3 after the shift may include five pixels, and that the five pixels are sequentially arranged.

The image data generator 218 may generate the image data Pd2_1b, Pd2_2b, Pd2_3b, Pd2_4b, and Pd2_5b to be input into the five pixels using the image data Pd1_1b, Pd1_2b, and Pd1_3b to be input into the three pixels. For example, the image data generator 218 may generate the image data Pd2_1b positioned first from the left side in the second area SBx3 after the shift by using the image data Pd1_1b of the pixel positioned first from the left side in the second area SAx3 prior to the shift. The image data generator 218 may generate image data Pd2_1b using the image data Pd1_1b displayed in an area R1'. Also, the image data generator 218 may generate image data Pd2_2b by using the image data Pd1_1b displayed in an area R2' and by using the image data Pd1_2b displayed in an area R3' (where a size of the area R1'=a size of the area R2'+a size of the area R3').

Also, the image data generator 218 may generate the image data Pd2_3b using the image data Pd1_2b displayed in an area R4' (where the size of the area R1'=a size of the area R4'). Also, the image data generator 218 may generate the image data Pd2_4b by using the image data Pd1_2b displayed in an area R5' and by using the image data Pd1_3b displayed in an area R6' (where the size of the area R1'=a size of the area R5'+a size of the area R6'). Also, the image data generator 218 may generate image data Pd2_5b by using the image data Pd1_3b displayed in an area R7' (where the size of the area R1'=a size of the area R7').

The display device may display the image in the second area SBx3 after the shift, which is enlarged when compared to the image displayed in the second area SAx3 prior to the shift, using the image data Pd2_1b, Pd2_2b, Pd2_3b, Pd2_4b, and Pd2_5b generated by the image data generator 218.

The image displayed in the second area SAx3 prior to the shift may be displayed in the second area SBx3 after the shift on an enlarged scale of 5/3 ratio.

The image displayed in the pixel positioned first from the left side in the second area SBx3 after the shift may be enlarged and shifted in the negative x-axis direction by as much as the area R2', as compared to the image prior to the shift.

Also, the image displayed in the pixel positioned second from the left side in the second area SBx3 after the shift may be enlarged and shifted in the negative x-axis direction by as much as the area R2', as compared to the image prior to the shift, and the image displayed in the pixel positioned third from the left side in the second area SBx3 after the shift may be enlarged and shifted in the negative x-axis direction by as much as R2', as compared to the image prior to the shift.

Also, the image displayed in the pixel positioned fourth from the left side in the second area SBx3 after the shift may be enlarged and shifted in the negative x-axis direction by as much as the area R2', as compared to the image prior to the shift, and the image displayed in the pixel positioned fifth from the left side in the second area SBx3 after the shift may be enlarged and shifted in the negative x-axis direction by as much as R2', as compared to the image prior to the shift.

Figure 8A:
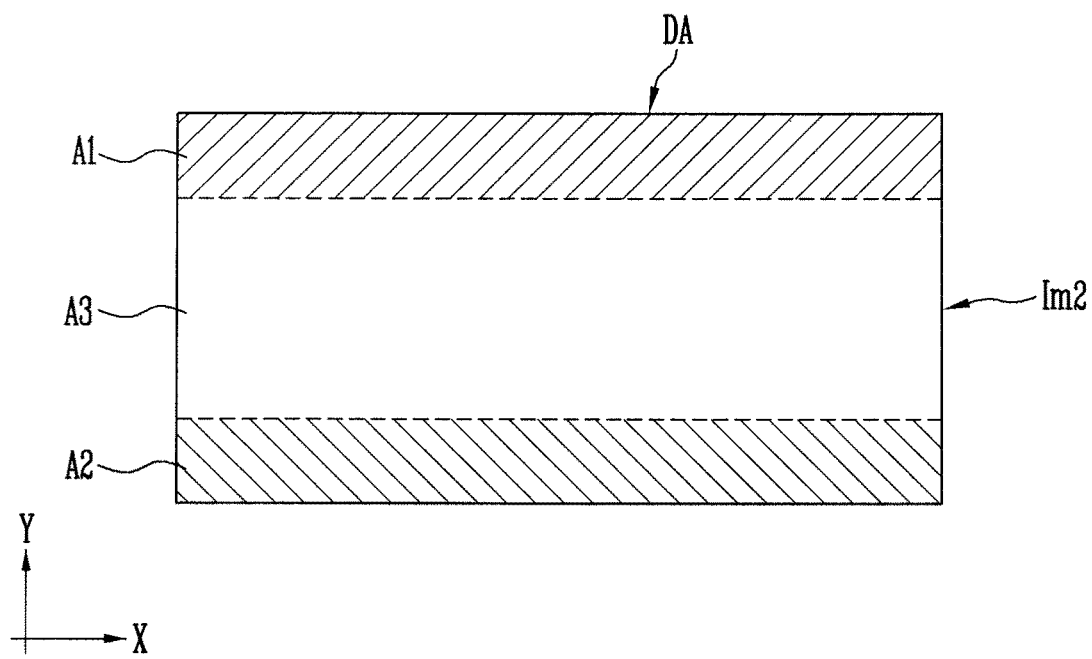
FIGS. 8A and 8B are conceptual diagrams for illustrating a method for displaying an image according to another embodiment of the present invention.
Figure 8B:
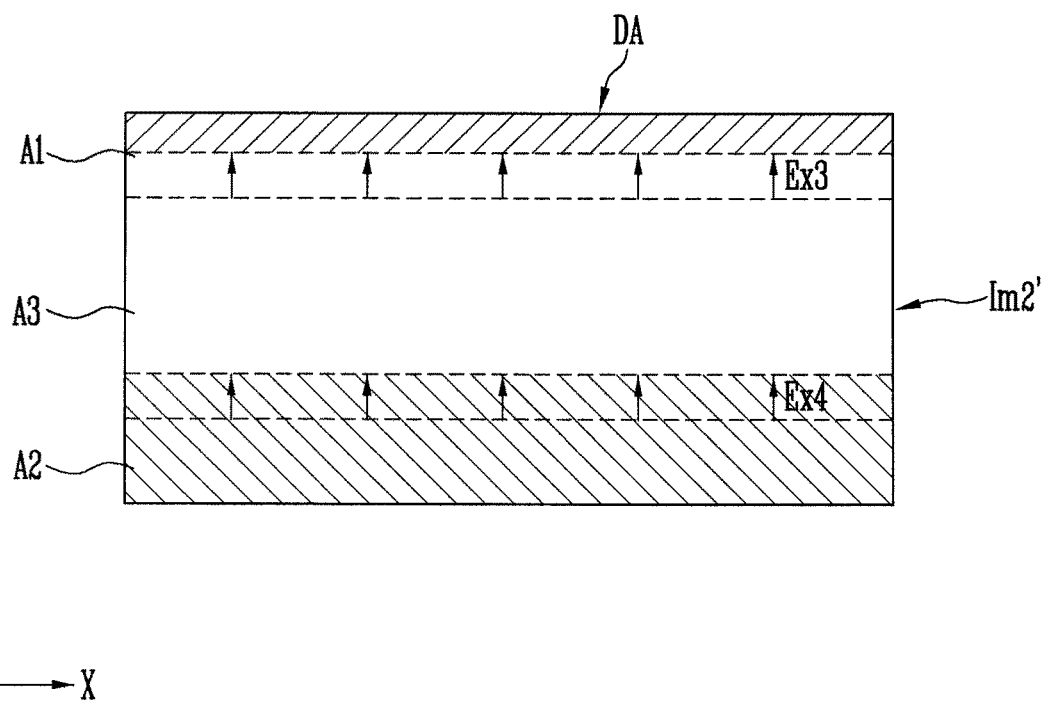

FIGS. 8A and 8B are conceptual diagrams for illustrating a method for displaying an image according to another embodiment.

FIGS. 8A and 8B show image shifting along a y-axis direction. Any repetitive description overlapping the embodiment relating to FIGS. 4A and 4B may not be provided.

Referring to FIG. 8A, the image Im2 may include a plurality of areas. For example, the image Im2 may include a first area A1, a second area A2, and a third area A3. The third area A3 may be between the first area A1 and the second area A2. Also, the first area A1 may be on an upper side of the third area A3, and the second area A2 may be on a lower side of the third area A3.

In a method for displaying an image by the display device in accordance with an embodiment, the image Im2 may be shifted and displayed, and certain portions included in the image Im2 may be reduced or enlarged. For example, the image Im2 may be displayed in a certain position of the image display area DA during an n-th period, and the image Im2 may be displayed as an image Im2' shifted in a certain direction (e.g., y-axis direction) during an (n+m)-th period (where m is a natural number that is 1 or greater). That is, the image Im2 may be shifted in a –y-axis direction (e.g., downward) or a +y-axis direction (e.g., upward). Referring to FIG. 8B, the display device may display the image Im2' in the image display area DA during the (n+m)-th period.

The image corrector 210 may set the first area A1 to a y-axis reduction area, and may set the second area A2 to a y-axis enlargement area. The image Im2' may be the image Im2 shifted by pixel shift operation and displayed. The first area A1 may be reduced by as much as a third extension Ex3 in accordance with image shifting, and the second area A2 may be enlarged by as much as a fourth extension Ex4. For example, the first area A1 and the second area A2 may maintain a regular area during an n-th period, while during the (n+m)-th period, the first area A1 of the image Im2' may be reduced by as much as a third extension Ex3, and the second area A2 may be enlarged by as much as a fourth extension Ex4. The second area A2 may be enlarged by as much as the first area A1 is reduced. For example, the third extension Ex3 may be the same as the fourth extension Ex4. Accordingly, the display device may shift the image Im2' while maintaining its entire size. In other words, the size of the image Im2' may be maintained the same as the size of the image Im2 prior to the shift. The image Im2 may shift in a direction in which the first area A1 is reduced.

The image corrector 210 may set the third area A3 to a y-axis shift area. Therefore, the third area A3 may shift along the direction in which the first area A1 is reduced. The third area A3 might not be reduced or enlarged, but may maintain its size.

In FIGS. 8A and 8B, the area on an upper side of the image Im2 and Im2' is referred to as the first area A1, and the area on a lower side of the image Im2 and Im2' is referred to as the second area A2. However, the first area A1 and the second area A2 may be exchanged. For example, the area on the upper side of the image Im2 and Im2' may be set to the first area A1, and the area on the lower side of the image Im2 and Im2' may be set to the second area A2.

As described above, by shifting the image Im2, after image may be restricted, and at the same time, after image may be more effectively restricted by undertaking reduction and enlargement with respect to inside areas A1 and A2 of the image Im2.

Figure 9:
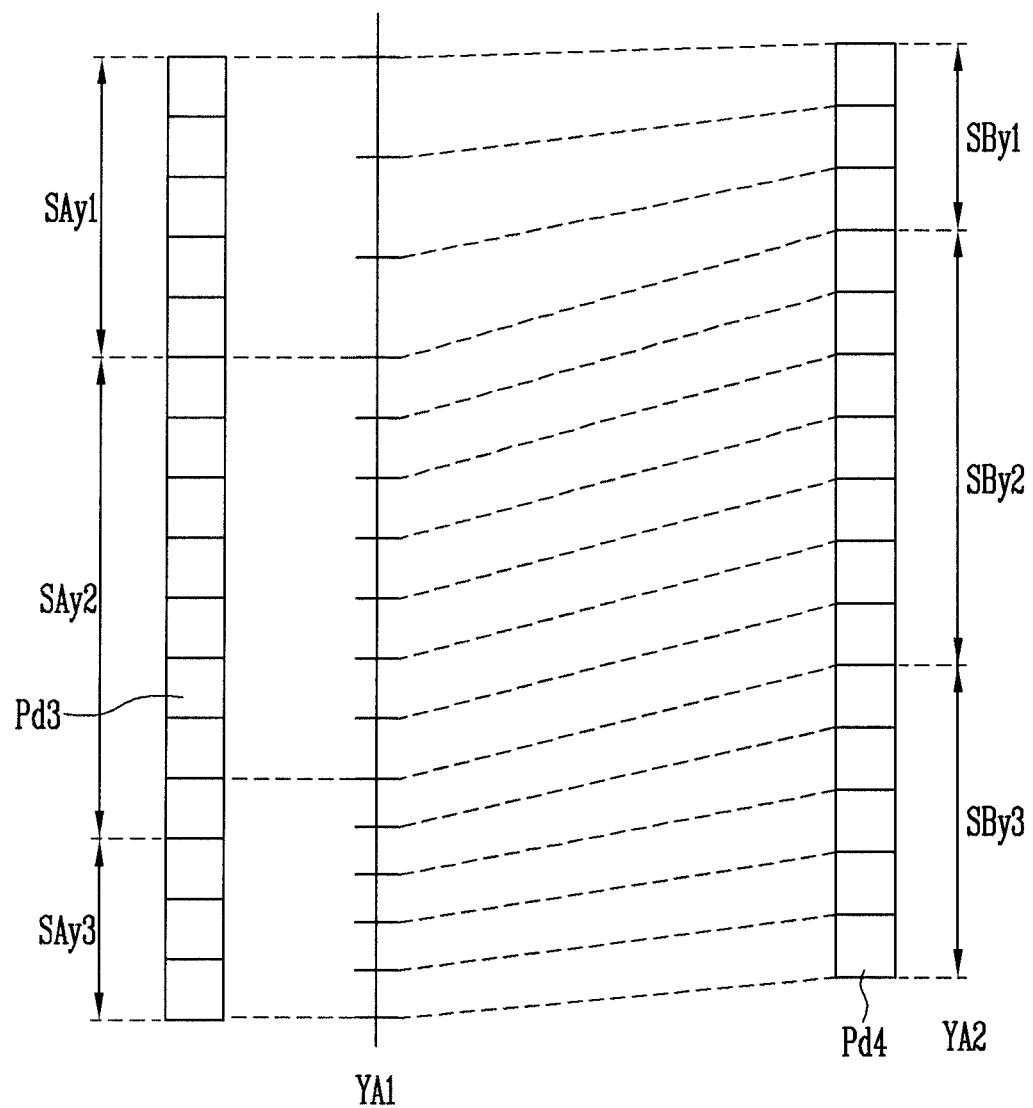
FIG. 9 is a conceptual diagram for illustrating a method for generating image data in a y-axis direction of an image corrector according to an embodiment of the present invention.

FIG. 9 is a conceptual diagram for illustrating a method for generating image data in a Y-axis direction of an image corrector according to an embodiment of the present invention.

In FIG. 9, for convenience of illustration, y-axis image data is shown, which is to be input in pixels in one column among pixels arranged in lattice form, and image data Pd3 or Pd4 refers to data displaying images to pixels. Also, it is assumed that the first image data DI1 includes the image data Pd3, and that the second image data DI2 includes the image data Pd4.

The y-axis area determiner 216-2 may divide an image into sub-areas SAy1, SAy2, and SAy3 along the y-axis direction. The y-axis area YA1 prior to the shift may include the sub areas SAy1, SAy2 and SAy3 before the image is shifted. Also, the y-axis area YA2 after the shift may include the sub areas SBy1, SBy2, and SBy3 after the image is shifted.

For example, the y-axis area determiner 216-2 may determine the image displayed on the pixels positioned from the top to the fifth from the top to a first area SAy1 prior to the shift, may determine the image displayed on the pixels positioned third from the bottom to the bottom to a second area SAy3, and may determine a third area SAy2 prior to the shift as the pixels between the first area SAy1 prior to the shift and the second area SAy3 prior to the shift.

The image data generator 218 may generate the image data Pd4 such that the image data Pd3 displaying the sub areas SAy1, SAy2, and SAy3 can be used to display the sub areas SBy1, SBy2, and SBy3. That is, the image data generator 218 may convert the image data Pd3 for displaying the first area SAy1 prior to the shift into the image data Pd4 for displaying the first area SBy1 after the shift. Also, the image data generator 218 may convert the image data Pd3 for displaying the second area SAy3 prior to the shift into the image data Pd4 for displaying the second area SBy3 after the shift. Also, the image data generator 218 may convert the image data Pd3 for displaying the third area SAy2 prior to shifting into the image data Pd4 for displaying the third area SBy2 after the shifting.

Figure 10:
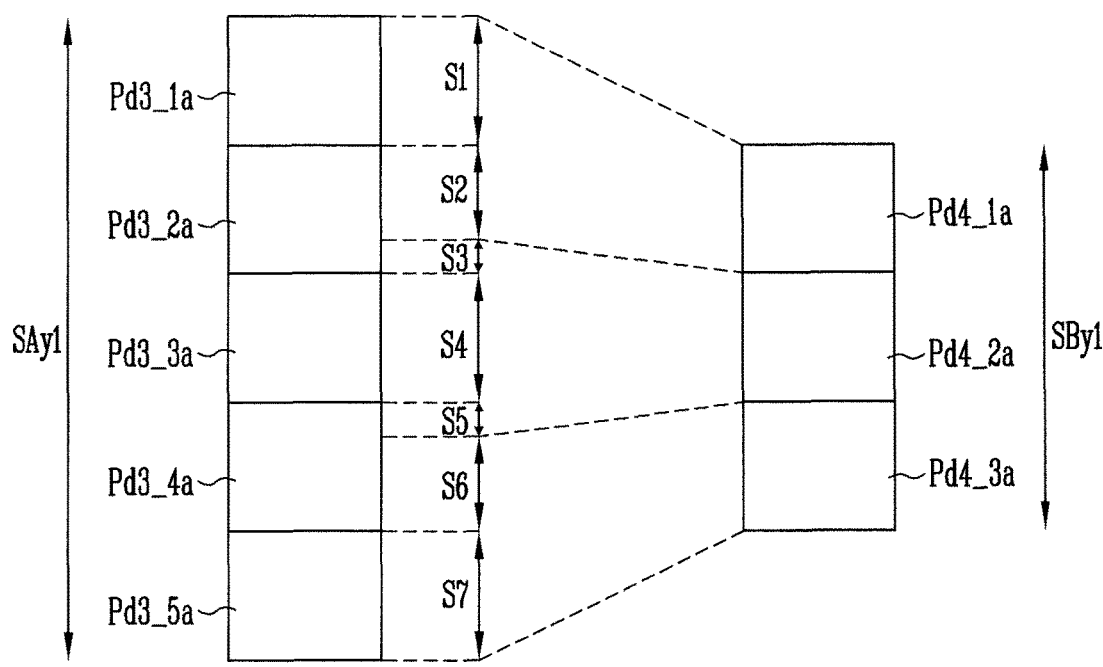
FIG. 10 is a conceptual diagram for illustrating a reduced area shown in FIG. 9.

FIG. 10 is a conceptual diagram for illustrating a reduced area shown in FIG. 9.

Referring to FIGS. 9 and 10, the y-axis area determiner 216-2 may determine the first area SBy1 after the shift, which is reduced when compared to the first area SAy1 prior to the shift, using shift direction information SDI and shift amount information SAI generated by the shift determiner

214. For example, when the shift direction information SDI is set to the −y-axis shift direction, and when the shift amount information SAI is set to n pixel shifting (where n is a positive number), the y-axis area determiner 216-2 may set the first area SBy1 after the shift, which is reduced by n pixel shifting in the −y-axis direction from the first area SAy1 prior to the shift.

Thereafter, to reduce the image, the image data generator 218 may convert the image displayed on p pixels (where p is a positive number) of the first area SAy1 prior to the shift into the image displayed on q pixels (where q is a positive number smaller than p) of the first area SBy1 after the shift. That is, the image data generator 218 may convert the image data to be supplied to p pixels into the image data to be supplied to q pixels. Because the image being displayed on p pixels is to be displayed on q pixels, the image displayed in the first area SBy1 after the shift may be displayed on a reduced scale according to a k ratio, when compared to the image displayed in the first area SAy1 before the shift (where k=q/p).

Referring to FIG. 10 again, the image data generator 218 may recombine the image data Pd3_1a, Pd3_2a, Pd3_3a, Pd3_4a, and Pd3_5a for displaying the first area SAy1 prior to the shift, and may convert the data into the image data Pd4_1a, Pd4_2a, and Pd4_3a for displaying the first area SBy1 after the shift.

For convenience of illustration, it is assumed that the first area SAy1 prior to the shift includes five pixels, that image data Pd3_1a, Pd3_2a, Pd3_3a, Pd3_4a, and Pd3_5a is to be input into the five pixels, and that the five pixels are sequentially arranged in the first area SAy1 prior to the shift. It is also assumed that the first area SBy1 after the shift includes three pixels, and that the three pixels are sequentially arranged.

The image data generator 218 may generate image data Pd4_1a, Pd4_2a, and Pd4_3a to be input into the three pixels using the image data Pd3_1a, Pd3_2a, Pd3_3a, Pd3_4a, and Pd3_5a to be input into the five pixels. For example, the image data generator 218 may generate the image data Pd4_1a to be input into the topmost pixel in the first area SBy1 after the shift by using the image data Pd3_1a, and Pd3_2a to be input into the topmost pixel and into the pixel positioned second from the top side of the first area SAy1 prior to the shift. That is, the image data generator 218 may generate the image data Pd4_1a using the image data Pd3_1a displayed in an area S1 and by using the image data Pd3_2a displayed in an area S2.

Also, the image data generator 218 may generate the image data Pd4_2a using the image data Pd3_2a displayed in an area S3, by using the image data Pd3_3a displayed in an area S4, and by using the image data Pd3_4a displayed in an area S5 (where a size of the area S2=a size of the area S3+a size of the area S5). Also, the image data generator 218 may generate the image data Pd4_3a using the image data Pd3_4a displayed in an area S6 and by using the image data Pd3_5a displayed in an area S7 (where the size of the area S2=a size of the area S6).

The display device may display an image that is reduced in the first area SBy1 after the shift, as compared to the image displayed in the first area SAy1 prior to the shift, by using the image data Pd4_1a, Pd4_2a, and Pd4_3a generated by the image data generator 218.

The image displayed in the first area SAy1 prior to the shift may be displayed in the first area SBy1 after the shift on a reduced scale of 3/5.

Accordingly, the image displayed on the pixel positioned first from the upper side in the first area SBy1 after the shift may be reduced from a corresponding portion of the image prior to the shift, and may be shifted by as much as the area S2 in the −y-axis direction. Also, the image displayed in the pixel positioned second from the upper side in the first area SBy1 after the shift may be reduced from a corresponding portion of the image prior to the shift, and may be shifted by as much as the area S2 in the −y-axis direction, and the image displayed in the pixel positioned third from the upper side in the first area SBy1 after the shift may be reduced from a corresponding portion of the image prior to the shift, and may be shifted by as much as the area S2 in the −y-axis direction.

Figure 11:
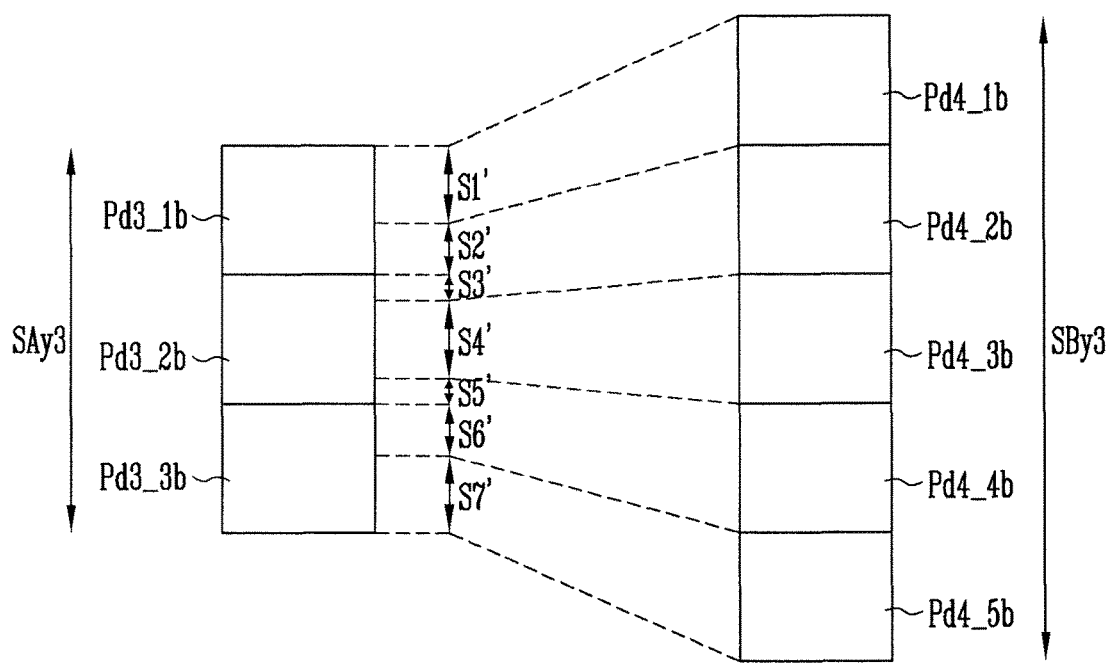
FIG. 11 is a conceptual diagram for illustrating an expanded area shown in FIG. 9.

FIG. 11 is a conceptual diagram for illustrating an expanded area shown in FIG. 9.

Referring to FIGS. 11 and 9, the y-axis area determiner 216-2 may determine the second area SBy3 after the shift, which is enlarged further than the second area SAy3 prior to the shift, using the shift direction information SDI and using the shift amount information SAI generated by the shift determiner 214.

When the shift direction information SDI is set to the −y-axis shift direction, and when the shift amount information SAI is set to n pixel shifting (where n is a positive number), the y-axis area determiner 216-2 may set the second area SBy3 after the shift, which is enlarged by as much as n pixel shifting in the −y-axis shift direction, as compared to the second area SAy3 prior to the shift.

To enlarge the image, the image data generator 218 may convert the image displayed in j pixels (where j is a positive number) of the second area SAy3 prior to the shift into the image displayed in i pixels (where i is a positive number greater than j) of the second area SBy3 after shifting. The image data generator 218 may convert the image data to be supplied to the j pixels into the image data to be supplied to the i pixels. Because the image displayed in the j pixels is displayed in the i pixels, the image displayed in the second area SBy3 after the shift may be displayed larger than the image displayed in the second area SAy3 prior to the shift according to an enlarged scale of k' (where k'=i/j).

Referring to FIG. 11 again, the image data generator 218 may recombine the image data Pd3_1b, Pd3_2b, and Pd3_3b for displaying the second area SAy3 prior to the shift, and may convert the data into the image data Pd4_1b, Pd4_2b, Pd4_3b, Pd4_4b, and Pd4_5b for displaying the second area SBy3 after the shift.

For convenience of illustration, it is assumed that the second area SAy3 prior to the shift includes three pixels, that image data Pd3_1b, Pd3_2b, and Pd3_3b is to be input into the three pixels, and that the three pixels are sequentially arranged in the second area SAy3 prior to the shift. It is also assumed that the second area SBy3 after the shift may include five pixels, and that the five pixels are sequentially arranged.

The image data generator 218 may generate the image data Pd4_1b, Pd4_2b, Pd4_3b, Pd4_4b, and Pd4_5b to be input into the five pixels by using the image data Pd3_1b, Pd3_2b, and Pd3_3b to be input into the three pixels. For example, the image data generator 218 may generate the image data Pd4_1b corresponding to the pixel positioned at the top of the upper side in the second area SBy3 after the shift using the image data Pd3_1b corresponding to the pixel positioned at the top of the upper side in the second area SAy3 prior to the shift. The image data generator 218 may generate image data Pd4_1b using the image data Pd3_1b displayed in an area S1'.

Also, the image data generator 218 may generate image data Pd4_2b using the image data Pd3_1b displayed in an area S2' and using the image data Pd3_2b displayed in an area S3' (where a size of the area S1'=a size of the area S2'+a size of the area S3'). Also, the image data generator 218 may generate the image data Pd4_3b using the image data Pd3_2b displayed in an area S4' (where the size of the area S1'=a size of the area S4'). Also, the image data generator 218 may generate the image data Pd4_4b using the image data Pd3_2b displayed in an area S5' and using the image data Pd3_3b displayed in an area S6' (where the size of the area S1'=a size of the area S5'+a size of the area S6'). Also, the image data generator 218 may generate image data Pd4_5b using the image data Pd3_3b displayed in an area S7' (where the size of the area S1'=a size of the area S7').

The display device may display the image in the second area SBy3 after the shift, which is further enlarged when compared to the image displayed in the second area SAy3 prior to the shift, using the image data Pd4_1b, Pd4_2b, Pd4_3b, Pd4_4b, and Pd4_5b generated by the image data generator 218.

The image displayed in the second area SAy3 prior to the shift may be displayed in the second area SBy3 after the shift on an enlarged scale of 5/3 ratio.

The image displayed in the pixel positioned at the top of the upper side in the second area SBy3 after the shift may be enlarged and shifted in the +y-axis direction by as much as the area S2', when compared to a corresponding portion of the image prior to the shift. Also, the image displayed in the pixel positioned second from the upper side in the second area SBy3 after the shift may be enlarged and shifted in the +y-axis direction by as much as the area S2', when compared to a corresponding portion of the image prior to the shift, and the image displayed in the pixel positioned third from the upper side in the second area SBy3 after the shift may be enlarged and shifted in the +y-axis direction by as much as S2', as compared to a corresponding portion of the image prior to the shift. Also, the image displayed in the pixel positioned fourth from the upper side in the second area SBy3 after the shift may be enlarged and shifted in the +y-axis direction by as much as the area S2', as compared to a corresponding portion of the image prior to the shift, and the image displayed in the pixel positioned fifth from the upper side in the second area SBy3 after the shift may be enlarged and shifted in the +y-axis direction by as much as S2', as compared to a corresponding portion of the image prior to the shift.

Figures 12, 13:
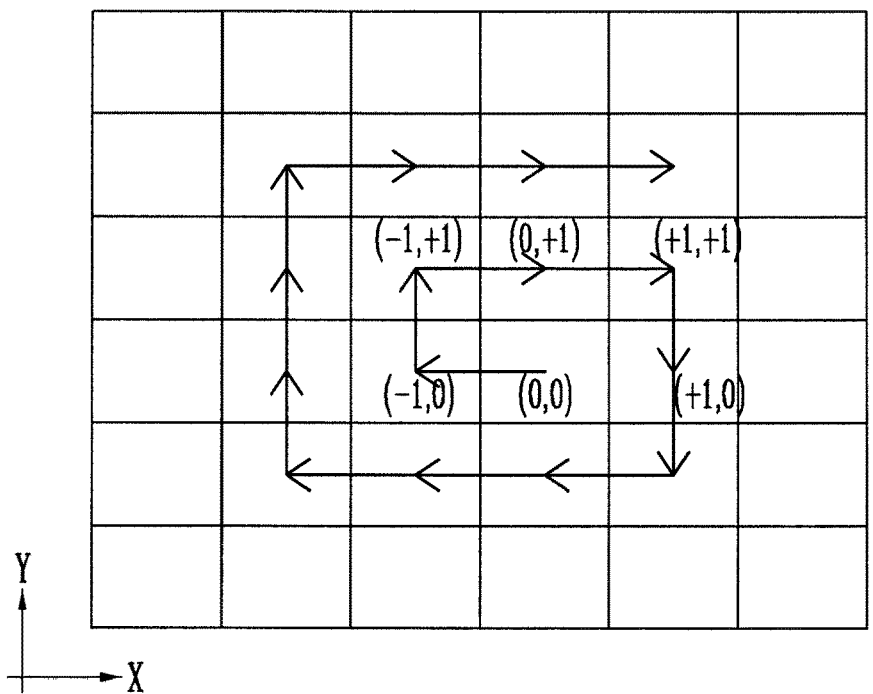
FIG. 12 is a look-up table according to an embodiment of the present invention.
FIG. 13 illustrates a method for a display device to move an image in accordance with the look-up table shown in FIG. 12.

FIG. 12 is a look-up table according to an embodiment of the present invention. FIG. 13 illustrates a method for a display device to move image in accordance with the look-up table shown in FIG. 12.

Referring to FIG. 12, a shift determiner 214 may determine an x-axis shift direction SDx and an x-axis shift amount SQx. Also, the shift determiner 214 may determine a y-axis shift direction SDy and a y-axis shift amount SQy. For example, the shift determiner 214 may determine x-axis and y-axis shift directions SDx and SDy and x-axis and y-axis shift amounts SQx and SQy corresponding to frame information CI using the frame information CI transferred from a frame data counter 212.

Referring to FIG. 13, the display device may shift an image in accordance with the x-axis and y-axis shift directions SDx and SDy, and in accordance with the x-axis and y-axis shift amounts SQx and SQy. For example, when the first image data is determined as $10^{th}$ input frame data using the frame information CI, the display device may shift image by '−1' in a negative x-axis direction in accordance with the x-axis shift direction SDx and the x-axis shift amount SQx stored in a look-up table.

For example, but without limitation thereto, when the first image data is determined as $20^{th}$ input frame data using the frame information CI, the display device may shift the image by '−1' in negative x-axis direction in accordance with the x-axis shift direction SDx and in accordance with the x-axis shift amount SQx, and may shift the image by '+1' in a +y-axis direction in accordance with y-axis shift direction SDy and the y-axis shift amount SQy stored in a look-up table.

In FIG. 13, (+) refers to the x-axis shift direction SDx being in a positive direction (e.g., toward the right side) and (−) refers to the x-axis shift direction SDx being a negative direction (e.g., toward the left side). Furthermore, (+) refers to the y-axis shift direction being positive direction (e.g., toward the upper side) and (−) refers to the y-axis shift direction SDy being negative direction (e.g., toward the lower side). However, the present invention is not limited thereto, and shift directions SDx and SDy may be expressed in various ways.

It will be understood that, although the terms "first", "second", "third", etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the inventive concept." Also, the term "exemplary" is intended to refer to an example or illustration.

It will be understood that when an element or layer is referred to as being "on", "connected to", "coupled to", or "adjacent to" another element or layer, it can be directly on, connected to, coupled to, or adjacent to the other element or layer, or one or more intervening elements or layers may be present. When an element or layer is referred to as being "directly on," "directly connected to", "directly coupled to", or "immediately adjacent to" another element or layer, there are no intervening elements or layers present.

As used herein, the term "substantially," "about," and similar terms are used as terms of approximation and not as terms of degree, and are intended to account for the inherent variations in measured or calculated values that would be recognized by those of ordinary skill in the art.

As used herein, the terms "use," "using," and "used" may be considered synonymous with the terms "utilize," "utilizing," and "utilized," respectively.

The image corrector and/or any other relevant devices or components according to embodiments of the present invention described herein may be implemented utilizing any suitable hardware, firmware (e.g. an application-specific integrated circuit), software, or a suitable combination of software, firmware, and hardware. For example, the various components of the image corrector may be formed on one integrated circuit (IC) chip or on separate IC chips. Further, the various components of the image corrector may be implemented on a flexible printed circuit film, a tape carrier package (TCP), a printed circuit board (PCB), or formed on a same substrate. Further, the various components of the image corrector may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims, and equivalents thereof.

What is claimed is:

1. An image corrector comprising:
a processor; and
a memory coupled to the processor, wherein the memory stores instructions that, when executed by the processor, cause the processor to:
determine a shift direction and a shift amount of an image corresponding to first image data;
divide the image along an axis of a total display area into a plurality of areas and, in accordance with the shift direction, to determine a first area of the plurality of areas as a reduction area, a second area of the plurality of areas as an enlargement area, and a third area of the plurality of areas between the first area and the second area; and
set second image data corresponding to the shift amount of the image corresponding to the first area such that the first area is reduced in size, the second area is enlarged in size, and the third area is neither reduced nor enlarged in size.

2. The image corrector as claimed in claim 1, wherein the third area of the image is shifted in a direction towards a location of the reduction area in the enlargement area.

3. The image corrector as claimed in claim 1, wherein the instructions further cause the processor to combine a portion of image data for displaying the third area and image data for displaying the first area to generate enlarged image data, the third area being between the first area and the second area.

4. The image corrector as claimed in claim 1, wherein the instructions further cause the processor to set enlarged image data corresponding to the shift amount to image data to be input into the second area.

5. The image corrector as claimed in claim 1, wherein the instructions further cause the processor to generate enlarged image data using a portion of image data for displaying the second area.

6. The image data as claimed in claim 1, wherein the image is shifted from the enlargement area to the reduction area.

7. The image corrector as claimed in claim 1, wherein a size of an image display area of the image is maintained to be the same as that of the image prior to the shift and that of the image after the shift.

8. The image corrector as claimed in claim 1, wherein the instructions further cause the processor to receive frame data comprising a plurality of image data and to calculate an input number of the frame data.

9. The image corrector as claimed in claim 8, wherein the instructions further cause the processor to determine a look-up table corresponding to the input number and to determine the shift direction and the shift amount using a value in the look-up table.

10. The image corrector as claimed in claim 1, wherein the instructions further cause the processor to:
determine an x-axis shift direction and an x-axis shift amount of the image; and
determine a y-axis shift direction and a y-axis shift amount of the image.

11. The image corrector as claimed in claim 10, wherein the instructions further cause the processor to determine the x-axis shift amount such that the image shifts along an x-axis by an amount that is less than a size of an image displayed in one pixel.

12. The image corrector as claimed in claim 10, wherein the instructions further cause the processor to determine the y-axis shift amount such that the image shifts along a y-axis by an amount that is less than a size of an image displayed in one pixel.

13. The image corrector as claimed in claim 10, wherein the instructions further cause the processor to determine the y-axis shift direction and the y-axis shift amount after determining the x-axis shift direction and the x-axis shift amount.

14. The image corrector as claimed in claim 10, wherein the instructions further cause the processor to determine the x-axis shift direction and the x-axis shift amount after determining the y-axis shift direction and the y-axis shift amount.

15. A display device comprising:
a display panel comprising a plurality of pixels;
a processor; and
a memory coupled to the processor, wherein the memory stores instructions that, when executed by the processor, cause the processor to:
generate image data;
determine a shift direction and a shift amount of an image;
divide the image along an axis of a total display area into a plurality of areas;
determine a first area of the plurality of areas as a reduction area in accordance with the shift direction;
determine a second area as an enlargement area;
determine a third area between the first area and the second area; and
set image data, which is reduced to correspond to the shift amount, to image data for displaying the first area such that the first area is reduced in size, the second area is enlarged in size, and the third area is neither reduced nor enlarged in size.

16. The display device as claimed in claim 15,
wherein the instructions further cause the processor to:
receive frame data comprising a plurality of image data and to calculate an input number of the frame data,
determine a look-up table corresponding to the input number; and
use values contained in the look-up table to determine the shift direction and the shift amount.

17. The display panel as claimed in claim 15, wherein the instructions further cause the processor to determine the shift amount such that the image is shifted by an amount that is less than a size of an image displayed in one pixel.

18. The display panel as claimed in claim 15, wherein the image is shifted toward a location of the reduction area in the enlargement area, and wherein a size of a display area of the image prior to the shift is the same as a size of the image after the shift.

19. The display device as claimed in claim 15, wherein the instructions further cause the processor to combine a portion of image data for displaying the third area between the first area and the second area and image data for displaying the first area to generate reduced image data.

20. A method for displaying images by a display device comprising a display panel comprising a plurality of pixels, and a processor, the method comprising:
generating, by the processor, image data;
receiving, by the processor, frame data comprising a plurality of image data, by an image corrector circuit;
calculating, by the processor, an input number of the frame data;
determining, by the processor, a look-up table corresponding to a result of the calculation, by the image corrector circuit;
determining, by the processor, a shift direction and a shift amount of an image using a value in a look-up table, by the image corrector circuit;
dividing, by the processor, the image along an axis of a total display area into a plurality of areas;
determining, by the processor, a first area as a reduced area of the plurality of areas, a second area as an enlarged area, depending on the shift direction, and a third area between the first area and the second area; and
setting, by the processor, reduced image data corresponding to the shift amount to image data for displaying the first area such that the first area is reduced in size, the second area is enlarged in size, and the third area is neither reduced nor enlarged in size.

* * * * *